(12) United States Patent
Choi et al.

(10) Patent No.: US 10,562,066 B2
(45) Date of Patent: Feb. 18, 2020

(54) LINEAR VIBRATOR

(71) Applicant: MPLUS CO., LTD., Suwon-si, Gyeonggi-do (KR)

(72) Inventors: Jun Kun Choi, Suwon-si (KR); Yeon Ho Son, Suwon-si (KR); Seok Jun Park, Suwon-si (KR); Tae Hoon Lee, Daejeon (KR)

(73) Assignee: MPLUS CO., LTD., Suwon-si, Gyeonggi-Do (KR)

(*) Notice: Subject to any disclaimer, the term of this patent is extended or adjusted under 35 U.S.C. 154(b) by 394 days.

(21) Appl. No.: 15/623,812

(22) Filed: Jun. 15, 2017

(65) Prior Publication Data

US 2018/0250709 A1  Sep. 6, 2018

(30) Foreign Application Priority Data

Mar. 3, 2017  (KR) .................. 10-2017-0027917

(51) Int. Cl.
 *B06B 1/04* (2006.01)
 *H02K 33/00* (2006.01)
 (Continued)

(52) U.S. Cl.
 CPC .......... *B06B 1/045* (2013.01); *H02K 11/0094* (2013.01); *H02K 33/00* (2013.01); *H02K 33/16* (2013.01)

(58) Field of Classification Search
 CPC ....... B06B 1/045; B06B 1/04; H02K 11/0094; H02K 33/00; H02K 33/02; H02K 33/06; H02K 33/16
 (Continued)

(56) References Cited

U.S. PATENT DOCUMENTS 8,134,259 B2 * 3/2012 Choi .................. H02K 33/18
                                                       310/15
9,913,364 B2 * 3/2018 Choi .................. H05K 1/0216
 (Continued)

FOREIGN PATENT DOCUMENTS

JP     2013163172 A    8/2013
JP     2016185073 A   10/2016
 (Continued)

OTHER PUBLICATIONS

KIPO Office Action for Korean Application No. 10-2017-0027917 dated Feb. 13, 2018 which corresponds to the above-referenced U.S. application.
 (Continued)

*Primary Examiner* — Jeremy A Luks
(74) *Attorney, Agent, or Firm* — LRK Patent Law Firm

(57) ABSTRACT

A linear vibrator having a flexible printed circuit board including a copper film pattern processed in a meander line pattern and, more particularly, a linear vibrator for solving a frequency interference problem between an electromagnetic structure and antenna disposed within a mobile device using a flexible printed circuit board (FPCB) including a copper film pattern processed in a meander line pattern in the linear vibrator. The linear vibrator can avoid resonant frequency interference through the copper film pattern having a frequency region out of the resonant frequency region of an antenna within a mobile device by processing the copper film pattern unique to an FPCB used in a linear vibrator.

12 Claims, 6 Drawing Sheets

(51) Int. Cl.
*H02K 33/16* (2006.01)
*H02K 11/00* (2016.01)

(58) Field of Classification Search
USPC .................................. 310/23, 25, 30, 34
See application file for complete search history.

(56) References Cited

U.S. PATENT DOCUMENTS

| | | | | |
|---|---|---|---|---|
| 2011/0062801 | A1* | 3/2011 | Choi | H02K 33/06 |
| | | | | 310/17 |
| 2013/0043741 | A1* | 2/2013 | Jun | H02K 33/16 |
| | | | | 310/15 |
| 2013/0113305 | A1* | 5/2013 | Choi | H02K 33/18 |
| | | | | 310/15 |
| 2019/0103796 | A1* | 4/2019 | Shim | H02K 33/04 |

FOREIGN PATENT DOCUMENTS

| | | |
|---|---|---|
| KR | 10-0541113 B1 | 1/2006 |
| KR | 1020060000467 A | 1/2006 |
| KR | 10-1101330 B1 | 12/2011 |
| KR | 10-1141726 B1 | 5/2012 |
| KR | 10-2013-0122238 A | 11/2013 |
| KR | 10-1777716 B1 | 9/2017 |
| KR | 06674300 U | 11/2017 |

OTHER PUBLICATIONS

KIPO Notice of Allowance in connection with Korean Patent Application No. 2017-0027917, dated Oct. 22, 2018, which correspond to the above-referenced U.S. application.
SIPO Office Action in connection with Chinese Patent Application No. 201710599391.7, dated Aug. 21, 2019, which correspond to the above-referenced U.S. application.

* cited by examiner

LINEAR VIBRATOR

CROSS REFERENCE TO RELATED APPLICATION

The present application claims the benefit of Korean Patent Application No. 10-2017-0027917, filed in the Korean Intellectual Property Office on Mar. 3, 2017, the entire content of which is incorporated herein by reference.

BACKGROUND OF THE INVENTION

1. Technical Field

The present invention relates to a linear vibrator having a flexible printed circuit board (hereinafter referred to as an "FPCB") including a copper film pattern processed in a meander line pattern and, more particularly, to a linear vibrator capable of solving a frequency interference problem between an electromagnetic structure and antenna disposed within a mobile device using an FPCB including a copper film pattern processed in a meander line pattern in the linear vibrator.

2. Description of the Related Art

Recently, a mobile device tends to adopt a touch screen. If a touch screen is used, various haptic functions for generating vibration are used.

For this reason, a linear vibration motor having an excellent response characteristic and capable of implementing vibration in various frequency bands in order to implement various haptics has been used.

If the linear vibration motor is used in the mobile device, frequency interference is generated due to an interaction between an antenna and a vibration generator (motor) within the mobile device, thereby being capable of affecting the reception sensitivity of the antenna.

That is, a conventional technology has a problem in that interference with a frequency of an antenna is generated due to inductance caused by the copper film of an FPCB used in a linear vibration motor.

Accordingly, an embodiment of the present invention proposes an FPCB having a copper film pattern shape having a frequency region out of the resonant frequency region of an antenna and a linear vibrator using the FPCB.

PRIOR ART DOCUMENT

Patent Document (Patent Document 1) Korean Patent No. 10-1101330

SUMMARY OF THE INVENTION

The present invention has been made keeping in mind the above problems occurring in the prior art, and an object of the present invention is to avoid antenna resonant frequency interference by processing a copper film pattern shape having a frequency region out of the resonant frequency region of an antenna in order to solve a problem in that interference with the frequency of the antenna is generated due to inductance caused by the copper film of an FPCB.

A linear vibrator according to an embodiment of the present invention includes a stator 10 including a casing 11 and a bracket 12 and forming an internal space, a coil 30 disposed on top of the bracket 12, a vibrator 20 including a magnet, an elastic member 90 having one side connected to the stator 10 and the other side connected to the vibrator 20, and a flexible printed circuit board (FPCB) 40 located between the bracket 12 and the coil 30 and electrically connecting an external power unit 100 and the coil 30. The FPCB 40 includes a first section 41 connected to the coil 30 by soldering, a third section 43 connected to the external power unit 100, and a second section 42 connecting the first section 41 and the third section 43 and extending in a specific length. A copper film pattern 60 formed in the FPCB 40 includes at least a portion of a meander line pattern having two lines or more overlapped.

The FPCB means a circuitry board formed by forming various electrical and electronic elements on a flexible insulating substrate using a printing engraving technology (e.g., embossing, plating or etching) or a film circuitry technology.

The meander line pattern may be formed in the second section, which connects the first section formed in a circle or a circular arc while forming a concentric circle with the coil and the third section connected to the external power source and which extends in a specific length.

Furthermore, the meander line pattern may be formed in the second section, which connects the first section formed in a portion where the coil and the FPCB are soldered and the third section connected to the external power source and which extends in a specific length.

Alternatively, the meander line pattern may be formed in the second section, which connects the first section formed in a portion where the coil and the FPCB are soldered and the third section connected to the external power source and which extends in a specific length. In this case, the meander line pattern may be formed in the second section region formed in a circle or a circular arc while forming a concentric circle with the coil.

Furthermore, the FPCB may have a copper film formed on a polyimide layer in a specific pattern. A surface of a circuit board on which a polyimide layer and the copper film pattern layer have been formed may be partially covered with an insulator.

The polyimide is a polymer material having thermal stability and has an excellent mechanical strength, chemically resistant property, weather-proof property and heat-resisting property based on the chemical stability of an imide ring.

In this case, the copper film pattern may be formed in a single layer on one side of the polyimide layer or may be formed in two or more multiple layers on both sides of the polyimide layer.

A linear vibrator according to another embodiment of the present invention a stator 10 including a casing 11 and a bracket 12 and forming an internal space, a vibrator 20 including a polymer 80 and a coil 30, an elastic member 90 having one side connected to the stator 10 and the other side connected to the vibrator 20, and a flexible printed circuit board (FPCB) 40 located under the coil 30 or the polymer and electrically connecting an external power unit 100 and the coil 30. The FPCB 40 includes a first section 41 connected to the coil 30 by soldering, a third section 43 connected to the external power unit 100, and a second section 42 connecting the first section 41 and the third section 43 and extending in a specific length. A copper film pattern 60 formed in the FPCB 40 includes at least a portion of a meander line pattern having two lines or more overlapped.

In this case, the copper film pattern in the first section may have a circle or circular arc shape forming a concentric circle with the coil 30. The meander line pattern may be formed in the second section 42.

Furthermore, the meander line pattern may include a portion of the section of the circular arc shape forming the concentric circle with the coil 30 and may be formed in the second section 42. Furthermore, the FPCB may have a copper film formed on a polyimide layer in a specific pattern. A surface of a circuit board on which the polyimide layer and the copper film pattern have been formed may be partially covered with an insulator.

In this case, the copper film pattern may be formed in a single layer on one side of the polyimide layer or may be formed in two or more multiple layers on both sides of the polyimide layer.

DETAILED DESCRIPTION OF THE INVENTION

Figure 1:
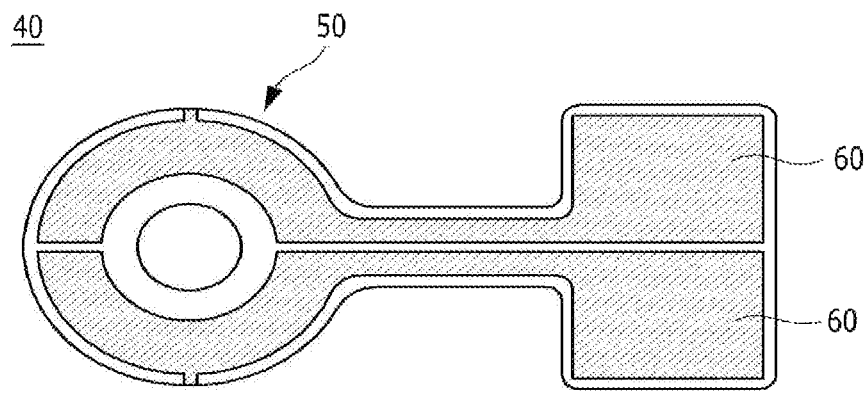
FIG. 1 is a top view of the FPCB of a linear vibrator according to a conventional art.
Figure 1:
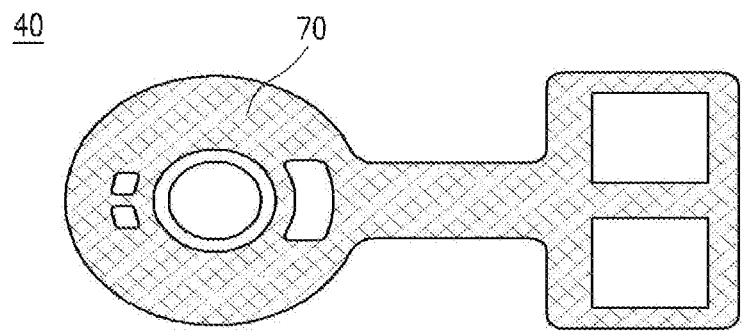
Figure 1:
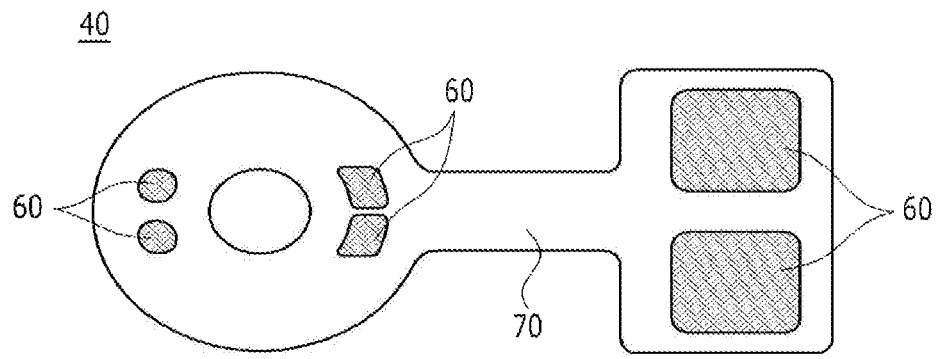

Hereinafter, embodiments of the present invention will be described in detail with reference to the accompanying drawings. It is to be noted that in assigning reference numerals to elements in the drawings, the same reference numerals denote the same elements throughout the drawings even in cases where the elements are shown in different drawings. Furthermore, in describing the embodiments of the present invention, a detailed description of the known functions and constitutions will be omitted if it is deemed to make the gist of the present invention unnecessarily vague.

Furthermore, in describing the elements of this specification, terms, such as the first, the second, A, B, (a), and (b), may be used. However, although the terms are used only to distinguish one element from the other element, the essence, order, or sequence of the elements is not limited by the terms. When it is said that one element is "connected", "combined", or "coupled" to the other element, the one element may be directly connected or coupled" to the other element, but it should also be understood that a third element may be "connected", "combined", or "coupled" between the two elements.

FIG. 1 is a top view of the FPCB of a linear vibrator according to a conventional art.

Figure 2:
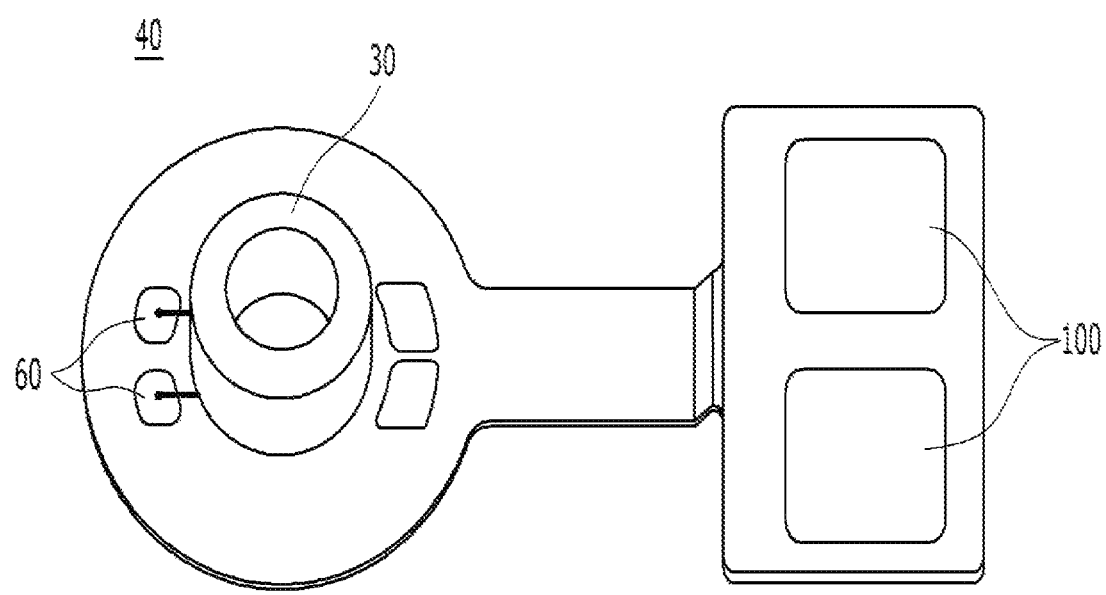
FIG. 2 is a perspective view of the FPCB of the linear vibrator according to the conventional art.

FIG. 2 is a perspective view of the FPCB of the linear vibrator according to the conventional art.

FIGS. 1 and 2 show a detailed configuration and copper film of the FPCB of the linear vibrator according to the conventional art.

More specifically, in FIG. 1, (a) is a diagram showing polyimide and a copper film, (b) is a diagram showing the configuration of an insulator, and (c) is a diagram showing the configuration of a coupled FPCB including the configuration of the insulator after the polyimide and the copper film are coupled.

The conventional art shown in (a) shows that the copper film has been simply coated or attached to the top of the polyimide layer and has not been patterned in any shape.

Furthermore, FIG. 2 shows that a structure coupled to a coil by a soldering process is disposed on the left side of the exposed copper film of the FPCB and a structure coupled to an external power unit is disposed on the right side of the exposed copper film of the FPCB.

In this case, in an FPCB having a structure, such as that of the conventional technology, an inductance value is set as a single value. A frequency may be generated in an interference region with the resonant frequency of an antenna, disposed within a mobile device, due to such an inductance value.

In order to solve such a frequency interference problem, an embodiment of the present invention avoids resonant frequency interference through a copper film pattern having a frequency region out of the resonant frequency region of an antenna by processing the copper film pattern unique to an FPCB used in a linear vibrator so that a problem in that interference with an antenna frequency is generated due to an inductance value attributable to the copper film of an FPCB in a conventional technology is solved.

Detailed configurations according to embodiments of the present invention are described below with reference to FIGS. 3 to 6.

Figure 3:
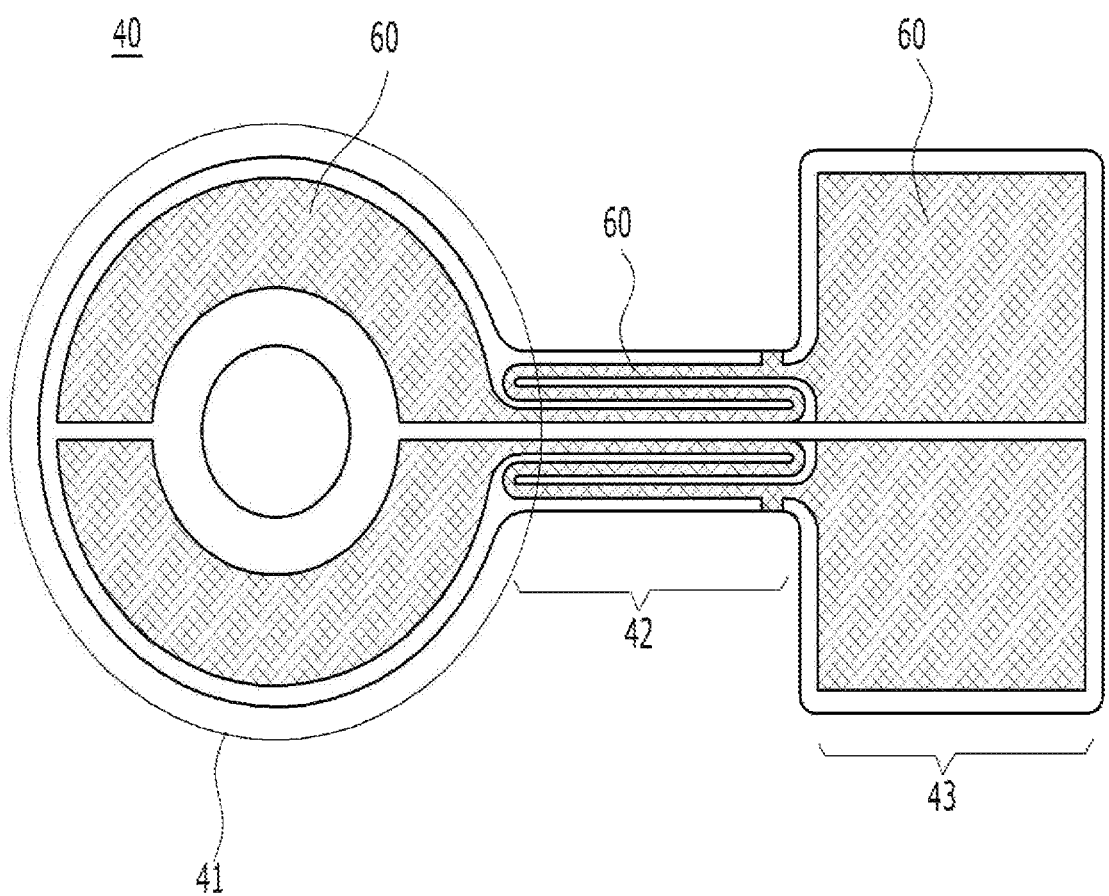
FIG. 3 is a top view of the FPCB of a linear vibrator according to an embodiment of the present invention.

FIG. 3 is a top view of the FPCB of a linear vibrator according to an embodiment of the present invention.

Figure 4:
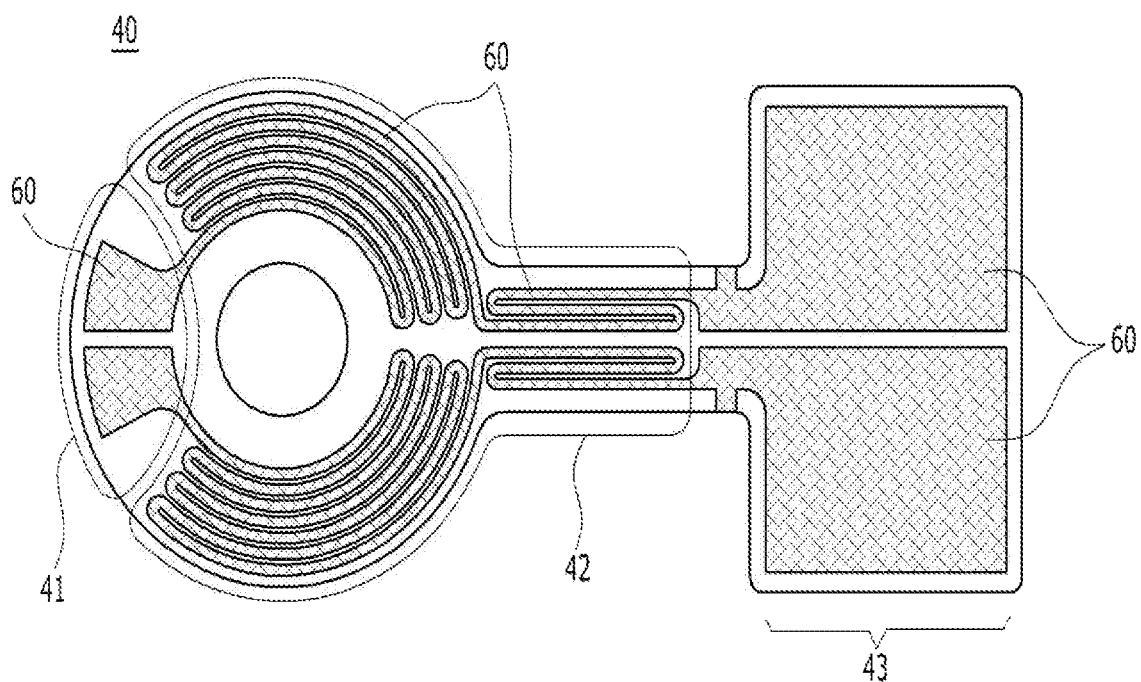
FIG. 4 is a top view of the FPCB of a linear vibrator according to another embodiment of the present invention.

FIG. 4 is a top view of the FPCB of a linear vibrator according to another embodiment of the present invention.

FIGS. 3 and 4 show the shape of the copper film pattern of an FPCB according to an embodiment of the present invention.

Referring to FIGS. 3 and 4, a configuration according to an embodiment of the present invention includes a stator 10 configured to form an internal space and to include a casing 11 and a bracket 12, a coil 30 provided on top of the bracket 12, and an FPCB 40 located between the bracket 12 and the coil 30 and configured to electrically connect an external power unit 100 and the coil 30. The FPCB 40 includes a first section 41 connected to the coil 30 by soldering, a third section 43 connected to the external power unit 100, and a second section 42 connecting the first section 41 and the third section 43 and extending in a specific length. A copper film pattern GO formed in the FPCB 40 includes at least a portion of a meander line pattern having two or more lines overlapped. That is, the meander line pattern according to an embodiment of the present invention is a pattern in which lines having opposite progress directions are overlapped at least once.

The linear vibrator has a structure in which the FPCB 40 is disposed under the coil or a polymer, and the coil and the FPCB 40 are not coupled to the stator and driven therewith.

In this case, the meander line pattern may be formed in the second section 42, which connects the first section 41 formed in a circle or a circular arc while forming a concentric circle with the coil 30 and the third section 43 connected to the external power unit 100 and which extends in a specific length.

Referring to FIG. 3, an inductance value related to a frequency may be controlled by changing the line length of an copper film located in the second section 42.

More specifically, $f = \frac{1}{2} \ast \pi \ast \sqrt{(LC)}$. In this case, f is a resonant frequency, L is inductance, and C is capacitance.

Accordingly, the L value is changed as the length of the copper film line is changed, and so the resonant frequency can be controlled.

Alternatively, the meander line pattern may be formed in the second section 42, which connects the first section 41 formed in a portion where the coil 30 and the FPCB 40 are soldered and the third section 43 connected to the external power unit 100 and which extends in a specific length.

In this case, the first section is not essentially formed in a circle. A point at which the FPCB 40 and the coil are soldered is defined as the first section.

In this case, the remaining section that belongs to a section formed in a circle or a circular arc while forming a concentric circle with the coil 30 and that does not include the first section is also defined as the second section along with the section that connects the first section and the third section.

Likewise, the second section 42 has a meander line pattern and can control an inductance value.

Furthermore, the meander line pattern may connect the first section 41 formed in a portion where the coil 30 and the FPCB 40 are soldered and the third section 43 connected to the external power unit 100, and may be formed in the second section 42 extending in a specific length. In this case, the meander line pattern may also be formed in the region of the second section 42 formed in a circle or a circular arc while forming a concentric circle with the coil 30.

Figure 5:
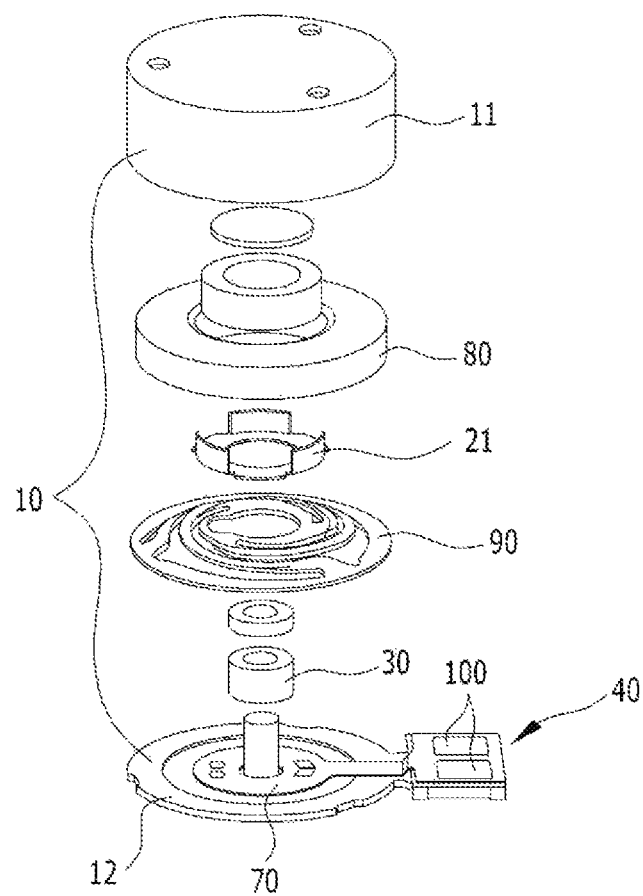
FIG. 5 is an exploded view and cross-sectional view of the linear vibrator including the FPCB according to an embodiment of the present invention.
Figure 5:
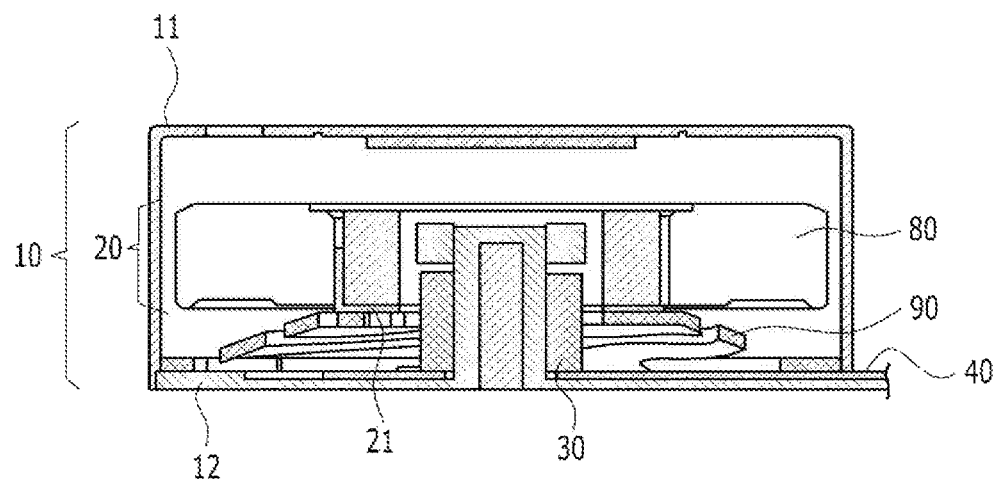

FIG. 5 is an exploded view and cross-sectional view of the linear vibrator including the FPCB according to an embodiment of the present invention.

From FIG. 5, it may be seen that the FPCB 40 has been fixed to the top of the bracket and fixed close to the coil.

In addition, the FPCB 40 has the copper film pattern 60 formed on the polyimide layer 50 in a specific pattern. A surface of the FPCB 40 on which the polyimide layer 50 and the copper film pattern 60 have been formed may be partially covered with an insulator 70. The reason for this is to enable the soldering processing of the coil and the FPCB 40, to enable connection between the FPCB 40 and the external power unit, and to prevent an electrical short by the insulator.

Furthermore, the copper film pattern 60 may be formed in a single layer on one side of the polyimide layer 50 or may be formed in two or more multi-layers on both sides of the polyimide layer 50.

In this case, in the case of the single layer, the meander patterns are connected by the +/− polarities of the coils. In the case of the multi-layers (both surfaces), the top may be connected to a polarity on one side of the coil and the bottom may be connected to a polarity on the other side of the coil.

In addition, in an embodiment of the present invention, a vibrator 20 that vibrates up and down may include a polymer 80, a magnet and a yoke 21.

Figure 6:
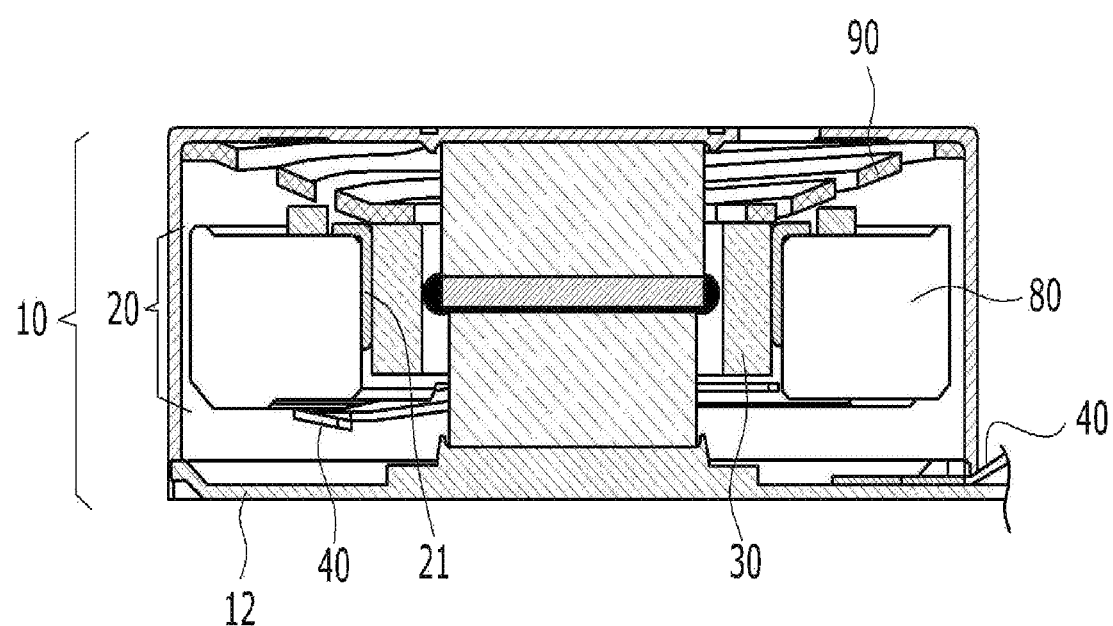
FIG. 6 is a cross-sectional view of a linear vibrator including an FPCB according to an embodiment of the present invention.

FIG. 6 is a cross-sectional view of a linear vibrator including an FPCB according to an embodiment of the present invention.

FIG. 6 shows a shape of the copper film pattern of the FPCB according to an embodiment of the present invention.

Specifically, referring to FIG. 6, a configuration according to an embodiment of the present invention includes the stator 10 configured to form an internal space and to include the casing 11 and the bracket 12, the vibrator 20 configured to include the polymer 80 and the coil 30, an elastic member 90 configured to have one side connected to the stator 10 and the other side connected to the vibrator 20, and the FPCB 40 disposed under the coil 30 or the polymer and configured to electrically connect the external power unit 100 and the coil 30. The FPCB 40 includes the first section 41 connected to the coil 30 by a soldering process, the third section 43 connected to the external power unit 100, and the second section 42 connecting the first section 41 and the third section 43 and extending in a specific length. The copper film pattern 60 formed in the FPCB 40 includes at least a portion of a meander line pattern in which two lines or more are overlapped. That is, the meander line pattern according to an embodiment of the present invention may have a structure in which lines having opposite progress directions are overlapped at least once.

The FPCB 40 is provided in the coil or the polymer, and the coil and the FPCB form a portion of the vibrator. The coil and the FPCB 40 form the vibrator or have one side coupled to the vibrator and driven therewith.

In this case, the meander line pattern may be formed in the second section 42, which connects the first section 41 formed in a circle or a circular are while forming a concentric circle with the coil 30 and the third section 43 connected to the external power unit 100 and which extends in a specific length.

Referring to FIG. 3, an inductance value related to a frequency may be controlled by changing the line length of a copper film located in the second section 42. More specifically, $f=\frac{1}{2}*\pi*\sqrt{(LC)}$. In this case, f is a resonant frequency, L is inductance, and C is capacitance.

Accordingly, the L value is changed as the length of the copper film line is changed, and so the resonant frequency can be controlled.

Alternatively, the meander line pattern may be formed in the second section 42, which connects the first section 41 formed in a portion where the coil 30 and the FPCB 40 are soldered and the third section 43 connected to the external power unit 100 and which extends in a specific length.

In this case, the first section is not essentially formed in a circle. A point at which the FPCB 40 and the coil are soldered is defined as the first section.

In this case, the remaining section that belongs to a section formed in a circle or a circular arc while forming a concentric circle with the coil 30 and that does not include the first section is also defined as the second section along with the section that connects the first section and the third section.

Likewise, the second section 42 has a meander line pattern and can control an inductance value.

Furthermore, the meander line pattern may connect the first section 41 formed in a portion where the coil 30 and the FPCB 40 are soldered and the third section 43 connected to the external power unit 100, and may be formed in the second section 42 extending in a specific length. In this case, the meander line pattern may also be formed in the region of the second section 42 formed in a circle or a circular arc while forming a concentric circle with the coil 30.

The present invention can avoid resonant frequency interference through the copper film pattern having a frequency region out of the resonant frequency region of an antenna within a mobile device by processing the copper film pattern unique to an FPCB used in a linear vibrator.

The technological spirit of the present invention has been illustrated above, but a person having ordinary skill in the art to which the present invention pertains may change and modify the present invention in various ways without departing from the essential characteristic of the present invention. Accordingly, the disclosed embodiments of the present invention should not be construed as limiting the technological spirit of the present invention, but should be construed as illustrating the technological spirit of the present invention and the scope of the technological spirit of the present invention is not restricted by the embodiments.

The range of protection of the present invention should be interpreted based on the following appended claims and all of the technological spirits of the present invention within equivalents thereof should be construed as being included in the range of right of the present invention.

What is claimed is:

1. A linear vibrator comprising:
   a stator (10) comprising a casing (11) and a bracket (12) and forming an internal space;
   a coil (30) disposed on a top of the bracket (12);
   a vibrator (20) comprising a magnet;
   an elastic member (90) having one side connected to the bracket (12) or the casing (11) and the other side connected to the vibrator (20), the elastic member (90) being formed to support the vibrator (20) and to vibrate the vibrator (20) through elastic force thereof; and
   a flexible printed circuit board (FPCB) (40) located between the bracket (12) and the coil (30) and electrically connecting an external power unit (100) and the coil (30),
   wherein the FPCB (40) comprises:
   a first section (41) connected to the coil (30) by soldering;
   a third section (43) connected to the external power unit (100); and
   a second section (42) connecting the first section (41) and the third section (43),
   wherein the first section (41) has a circular arc shape and is concentric to the coil (30),
   wherein a copper film pattern (60) is formed symmetrically on the first, second and third sections (41, 42, 43) in the FPCB (40) and comprises at least a portion of a meander line pattern having two lines or more overlapped,
   wherein the meander line pattern is formed on the second section (42), and
   wherein the second section (42) comprises a portion of a section of circular arc shape larger than the circular arc shape of the first section (41), the section of circular arc shape and the coil (30) being concentric to each other.

2. The linear vibrator of claim 1, wherein:
   the copper film pattern on the first section has a circle or circular arc shape.

3. The linear vibrator of claim 1, wherein the FPCB (40) has the copper film pattern (60) formed on a polyimide layer (50) in a specific pattern.

4. The linear vibrator of claim 3, wherein a surface of the FPCB (40) is partially covered with an insulator (70).

5. The linear vibrator of claim 3, wherein the copper film pattern (60) is formed on one side of the polyimide layer (50).

6. The linear vibrator of claim 3, wherein the copper film pattern (60) is formed on both sides of the polyimide layer (50).

7. A linear vibrator comprising:
   a stator (10) comprising a casing (11) and a bracket (12) and forming an internal space;
   a vibrator (20) comprising a polymer (80) and a coil (30);
   an elastic member (90) having one side connected to the bracket (12) or the casing (11) and the other side connected to the vibrator (20)), the elastic member (90) being formed to support the vibrator (20) and to vibrate the vibrator (20) through elastic force thereof; and
   a flexible printed circuit board (FPCB) (40) located under the coil (30) or the polymer (80) and electrically connecting an external power unit (100) and the coil (30),
   wherein the FPCB (40) comprises:
   a first section (41) connected to the coil (30) by soldering;
   a third section (43) connected to the external power unit (100); and
   a second section (42) connecting the first section (41) and the third section (43),
   wherein the first section (41) has a circular arc shape and is concentric to the coil (30),
   wherein a copper film pattern (60) is formed symmetrically on the first, second and third sections (41, 42, 43) in the FPCB (40) and comprises at least a portion of a meander line pattern having two lines or more overlapped,
   wherein the meander line pattern is formed on the second section (42), and
   wherein the second section (42) comprises a portion of a section of circular arc shape larger than the circular arc shape of the first section (41), the section of circular arc shape and the coil (30) being concentric to each other.

8. The linear vibrator of claim 7, wherein:
   the copper film pattern on the first section has a circle or circular arc shape.

9. The linear vibrator of claim 7, wherein the FPCB (40) has the copper film pattern (60) formed on a polyimide layer (50) in a specific pattern.

10. The linear vibrator of claim 9, wherein a surface of the FPCB (40) is partially covered with an insulator (70).

11. The linear vibrator of claim 9, wherein the copper film pattern (60) is formed on one side of the polyimide layer (50).

12. The linear vibrator of claim 9, wherein the copper film pattern (60) is formed on both sides of the polyimide layer (50).

* * * * *